(12) United States Patent
Park et al.

(10) Patent No.: US 9,389,476 B2
(45) Date of Patent: Jul. 12, 2016

(54) LIQUID CRYSTAL DISPLAY DEVICE AND METHOD OF DRIVING THE SAME

(71) Applicant: LG Display Co., Ltd., Seoul (KR)

(72) Inventors: Jong Sin Park, Goyang-si (KR); Chul Nam, Seoul (KR); Jae Hyung Jo, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 207 days.

(21) Appl. No.: 14/081,626

(22) Filed: Nov. 15, 2013

(65) Prior Publication Data

US 2014/0375922 A1 Dec. 25, 2014

(30) Foreign Application Priority Data

Jun. 19, 2013 (KR) .................. 10-2013-0070460

(51) Int. Cl.
| | |
|---|---|
| *G02F 1/1345* | (2006.01) |
| *G02F 1/133* | (2006.01) |
| *G02F 1/1362* | (2006.01) |
| *G09G 3/36* | (2006.01) |

(52) U.S. Cl.
CPC ........ *G02F 1/136286* (2013.01); *G02F 1/1345* (2013.01); *G09G 3/3677* (2013.01); *G09G 2300/0408* (2013.01); *G09G 2300/0426* (2013.01); *G09G 2310/0281* (2013.01); *G09G 2320/0223* (2013.01); *G09G 2330/08* (2013.01)

(58) Field of Classification Search
None
See application file for complete search history.

(56) References Cited

U.S. PATENT DOCUMENTS

| | | | | |
|---|---|---|---|---|
| 6,100,948 | A * | 8/2000 | Kim et al. ................. | 349/39 |
| 2003/0063248 | A1* | 4/2003 | Komeno et al. ........... | 349/149 |
| 2004/0239650 | A1* | 12/2004 | Mackey ................ | G06F 3/044 |
| | | | | 345/174 |
| 2010/0066967 | A1* | 3/2010 | Takahashi et al. ........ | 349/143 |
| 2010/0171687 | A1* | 7/2010 | Chiang et al. ............ | 345/98 |
| 2013/0113766 | A1* | 5/2013 | Kim et al. ................. | 345/205 |
| 2014/0152938 | A1* | 6/2014 | Lee et al. .................. | 349/46 |
| 2014/0168552 | A1* | 6/2014 | Jo et al. .................... | 349/33 |
| 2014/0168553 | A1* | 6/2014 | Park et al. ................ | 349/43 |
| 2014/0375534 | A1* | 12/2014 | Lee et al. .................. | 345/87 |
| 2015/0077317 | A1* | 3/2015 | Miyamoto et al. ........ | 345/87 |
| 2015/0085215 | A1* | 3/2015 | Yoshida ................... | 349/39 |

* cited by examiner

*Primary Examiner* — Ryan Crockett
(74) *Attorney, Agent, or Firm* — Dentons US LLP

(57) ABSTRACT

Disclosed is an LCD device that includes a plurality of horizontal gate lines provided in a horizontal direction in a liquid crystal panel, a plurality of data lines and a plurality of vertical gate lines provided in a vertical direction in the liquid crystal panel, and a driving IC connected to the plurality of vertical gate lines to supply a gate driving signal, and connected to the plurality of data lines to supply data voltages. One of the horizontal gate lines is connected to at least two vertical gate lines, and the driving IC supplies the same gate driving signal to the at least two vertical gate lines.

12 Claims, 15 Drawing Sheets

(A)

(B)

|  | single feeding | double feeding | quad feeding |
|---|---|---|---|
| gate signal delay | 7.95us | 3.77us | 2.16us |
| pixel charging ratio | 98.69% | 98.74% | 98.78% |

LIQUID CRYSTAL DISPLAY DEVICE AND METHOD OF DRIVING THE SAME

CROSS-REFERENCE TO RELATED APPLICATIONS

This application claims the benefit of the Korean Patent Application No. 10-2013-0070460 filed on Jun. 19, 2013, which is hereby incorporated by reference for all purposes as if fully set forth herein.

BACKGROUND OF THE INVENTION

1. Field of the Invention

The present invention relates to a flat panel display device. More particularly, the present invention relates to a liquid crystal display (LCD) device with a reduced bezel size and an enhanced aesthetic design appearance, and a method of driving the same which prevents a gate driving signal from being delayed due to a large size of a liquid crystal panel and thus can enhance a driving reliability and a display quality.

2. Discussion of the Related Art

With the advance of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, organic light emitting diode (OLED) display devices, etc. are developed as flat panel display devices.

In such FPD devices, the LCD devices are being continuously expanded in application field because the LCD devices are easily manufactured due to the advance of manufacturing technology and realize drivability of a driver, low power consumption, a high-quality image, and a large screen.

FIG. 1 is a view illustrating a related art LCD device, and FIG. 2 is a view illustrating a pixel structure of the related art LCD device.

Referring to FIGS. 1 and 2, in the related art LCD device, a liquid crystal panel in which a plurality of pixels are arranged in a matrix type, a driving circuit unit that drives the liquid crystal panel, a backlight unit (not shown) that supplies light to the liquid crystal panel, and a bezel (not shown) that is formed to surround the liquid crystal panel and the driving circuit unit are disposed.

The liquid crystal panel includes a lower substrate (TFT array substrate) in which the plurality of pixels and a plurality of lines for driving the pixels are provided. Also, the liquid crystal panel includes an upper substrate (color filter array substrate), in which a plurality of color filters and a plurality of black matrixes are formed, and a liquid crystal layer disposed between the two substrates.

A plurality of gate lines and a plurality of data lines are formed to intersect each other in the lower substrate of the liquid crystal panel. The plurality of pixels are respectively formed in a plurality of areas in which the gate lines and the data lines intersect each other. A thin film transistor (TFT), a switching element, is formed in each of the pixels. Also, a pixel electrode and a common electrode for applying an electric field are formed in each of the pixels.

The liquid crystal panel includes a display area 10 that displays an image and a non-display area that cannot display an image.

A data driver 40 is connected to an upper non-display area of the liquid crystal panel. A pad area, in which a plurality of pads receiving external signals for driving the respective pixels are provided, is formed in an outer non-display area of the lower substrate of the liquid crystal panel. Also, a link line that links a corresponding pad to a corresponding TFT and electrode is formed in plurality.

FIG. 3 is a sectional view illustrating the non-display area of the liquid crystal panel of the related art.

Referring to FIG. 3, a sealant 30 is formed in an outer portion (i.e., non-display area) of an active area in which the plurality of pixels are formed, and the upper substrate 1 and the lower substrate 2 are coupled to each other with the sealant 30.

A gate-in panel (GIP) type, in which a built-in shift register is disposed in the lower substrate 2, is applied for reducing the manufacturing cost of the LCD device due to the driving circuit unit adhered to the liquid crystal panel and reducing a volume and a weight. By disposing a gate driver in each of left and right non-display areas of the liquid crystal panel in the GIP type, the pad area and link lines for applying signals to the respective gate lines of the liquid crystal panel are removed.

The gate driver and the data driver receive different driving signals from a timing controller mounted on a printed circuit board (PCB) 50 and receive a driving voltage supplied from a power supply to thereby be driven.

The GIP type gate driver is disposed in each of the left and right non-display areas of the lower substrate 2. In FIG. 3, only the gate driver disposed at a left side of the lower substrate 2 is illustrated, and a gate driver disposed at the right side of the lower substrate 2 is not illustrated.

The GIP type gate driver includes a common voltage link area 22 receiving a common voltage (Vcom), a ground (GND) link area 24, and a shift register logic area 26 that generates a scan signal for turning on the TFTs of the liquid crystal panel.

Comparing with a type in which a gate driver manufactured as a separate chip is connected to the liquid crystal panel, the manufacturing cost of the LCD device can be reduced by applying the GIP type gate driver, and a volume and a weight can be reduced. However, bezel sizes of the left and right sides of the liquid crystal panel increase.

As illustrated in FIG. 3, the ground link area 24 overlaps the sealant 30, for increasing a bezel size. However, the common voltage link area 22 is formed to have a width of about 1 mm, and the shift register logic area 26 of the GIP type gate driver is formed to have a width of 5 mm to 6 mm. For this reason, a left bezel width and a right bezel width are formed at 7 mm to 8 mm. Thus, there is a limitation in reducing a size, causing a reduction in an aesthetic design appearance.

In the GIP type, there is a limitation in decreasing a width of each line and an interval between adjacent lines to a certain level or less, and thus, there is a difficulty in realizing a narrow bezel. When the width of each line and the interval between the adjacent lines are reduced for decreasing a bezel size, a line resistance increases, and thus, a signal is distorted and the shift register logic malfunctions.

Especially, in the GIP type, since it is impossible to remove lines, it is difficult to realize an ideal narrow bezel, and moreover, it is impossible to realize a borderless panel.

To solve the problems, a structure was proposed in which the TFT array substrate and the color filter array substrate are switched in disposed position, and the TFT array substrate is disposed at an upper side. However, external light is reflected by a plurality of lines formed in the TFT array substrate, causing a reduction in visibility of an image.

SUMMARY OF THE INVENTION

Accordingly, the present invention is directed to provide an LCD device and a method of driving the same that substantially obviate one or more problems due to limitations and disadvantages of the related art.

An aspect of the present invention is directed to provide an LCD device with a reduced size of a bezel formed at an outer portion of a liquid crystal panel.

Another aspect of the present invention is directed to provide an LCD device with a good aesthetic design appearance.

Another aspect of the present invention is directed to provide an LCD device with a reduced size of a pad area.

Another aspect of the present invention is directed to provide an LCD device of which the manufacturing cost is reduced.

Another aspect of the present invention is directed to provide an LCD device and a method of driving the same, which prevent a gate driving signal from being delayed due to a large size of a liquid crystal panel, thus enhancing a driving reliability and a display quality.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a plurality of horizontal gate lines provided in a horizontal direction in a liquid crystal panel; a plurality of data lines and a plurality of vertical gate lines provided in a vertical direction in the liquid crystal panel; and a driving IC connected to the plurality of vertical gate lines to supply a gate driving signal, and connected to the plurality of data lines to supply data voltages, wherein, one horizontal gate line is connected to at least two vertical gate lines, and the driving IC supplies the same gate driving signal to the at least two vertical gate lines at the same time.

In another aspect of the present invention, there is provided a method of driving an LCD device, which includes a plurality of data lines and a plurality of vertical gate lines provided in a vertical direction in a liquid crystal panel and a plurality of horizontal gate lines provided in a horizontal direction in the liquid crystal panel and in which one horizontal gate line is connected to at least two vertical gate lines, including sequentially supplying, by a driving IC, a gate driving signal to the plurality of vertical gate lines, the driving IC being disposed at an upper side or lower side of the liquid crystal panel, wherein the driving IC supplies the same gate driving signal to the at least two vertical gate lines at the same time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
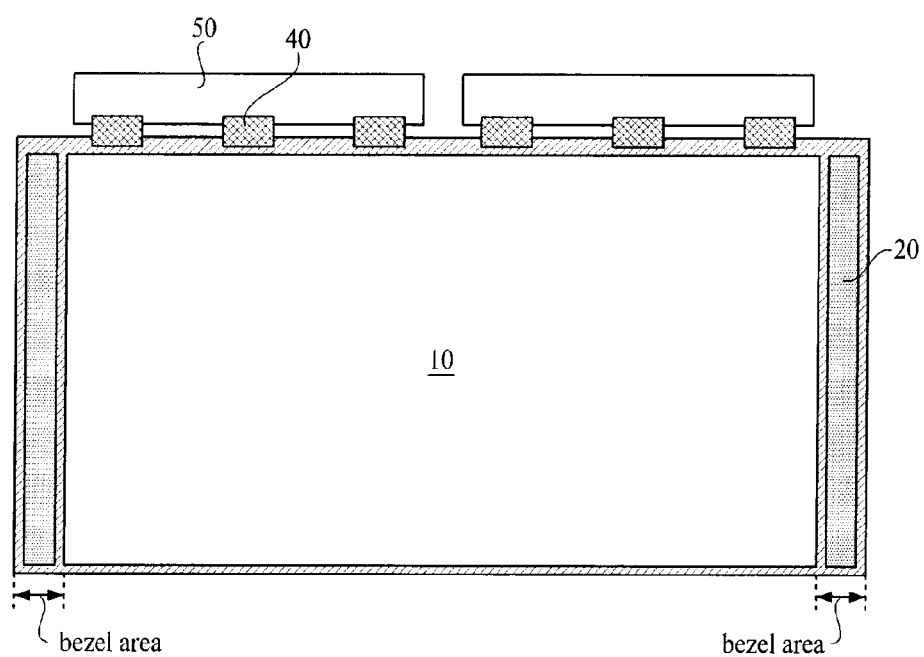
FIG. 1 is a view schematically illustrating a related art LCD device.
Figure 2:
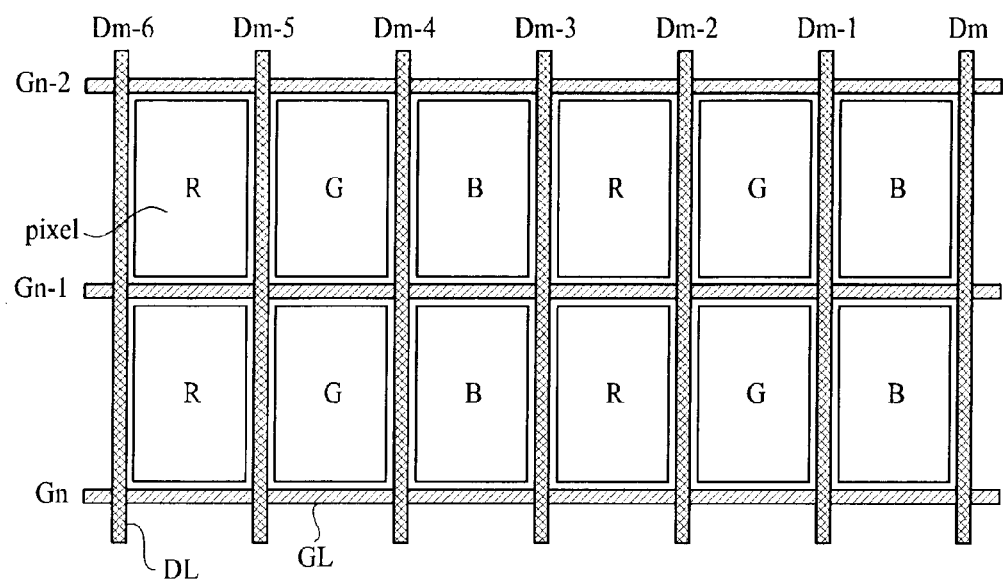
FIG. 2 is a view schematically illustrating a pixel structure of the related art LCD device.
Figure 3:
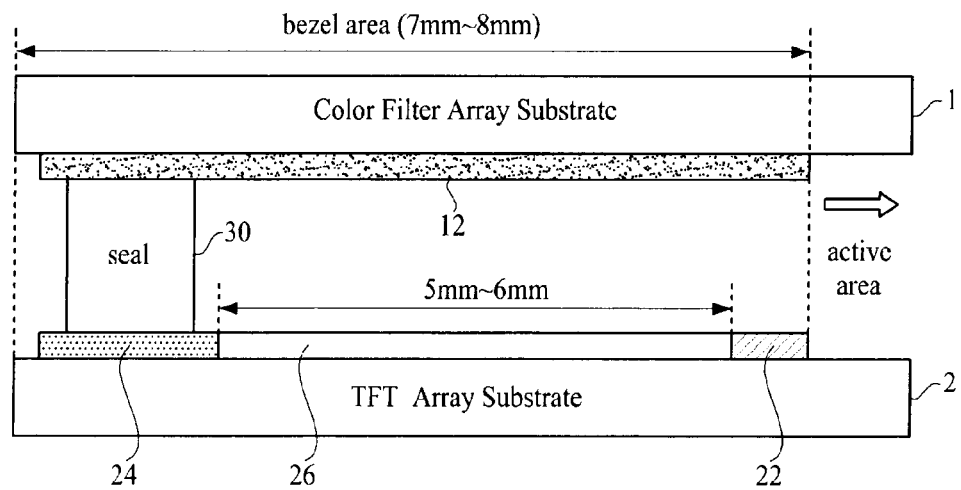
FIG. 3 is a sectional view illustrating a non-display area of a related art liquid crystal panel.

In the specification, in adding reference numerals for elements in each drawing, it should be noted that like reference numerals already used to denote like elements in other drawings are used for elements wherever possible.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms.

It should be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover a case where a third structure is disposed therebetween.

The main objective of the present invention is to reduce a bezel size of an LCD device. Therefore, an instrument irrelevant to a bezel and a backlight unit supplying light to a liquid crystal panel may not be illustrated, and their detailed description may not be provided.

A related art LCD device, in which a gate driver is disposed at a side surface of a liquid crystal panel, has a limitation in simultaneously supplying gate driving signals to one gate line. Recently, as the demand for super-size LCD devices that realize full high definition (FHD) or ultra high definition (UHD) increases progressively, methods for solving a problem caused by an increased load of gate lines are attracting much attention.

When the gate driver is disposed at each of both sides of the liquid crystal panel, only up to a maximum of double feeding can be performed, and thus, due to an increased load of the gate lines, there is a limitation in securing a driving stability. The present invention provides an LCD device and a method of driving the same which perform multi-feeding of a gate driving signal to prevent a gate driving signal from being delayed due to a large size of the liquid crystal panel, and thus can enhance a driving reliability and a display quality.

Hereinafter, an LCD device according to an embodiment of the present invention will be described in detail with reference to the accompanying drawings.

Figure 4:
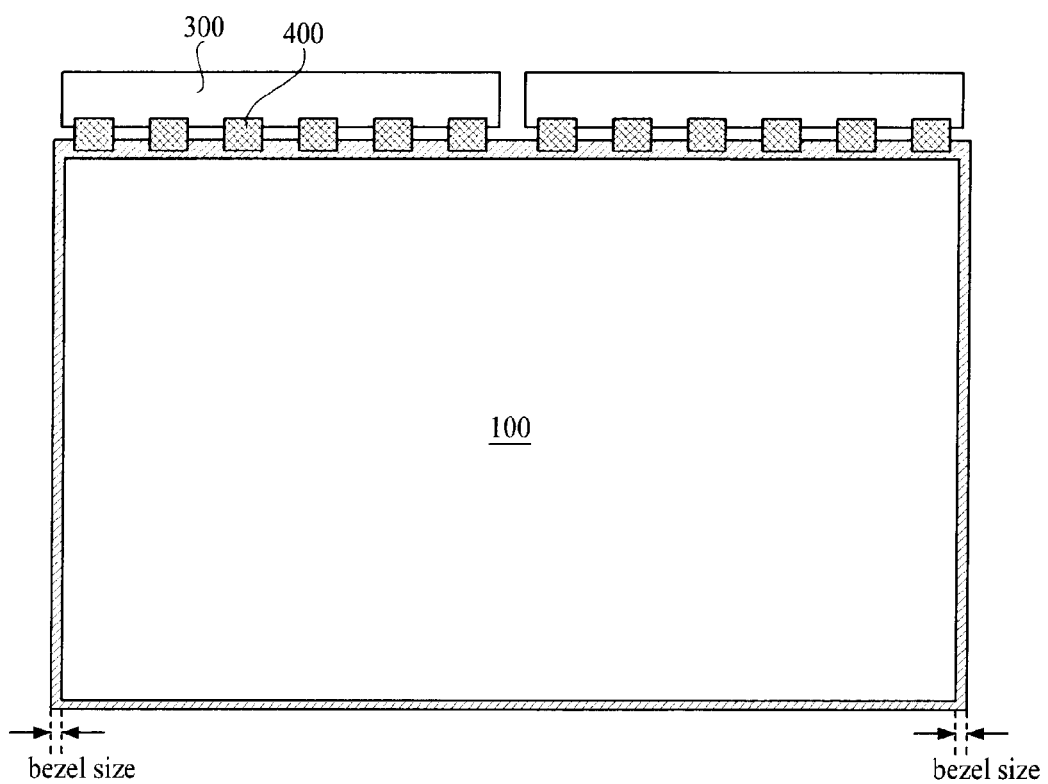
FIG. 4 is a view schematically illustrating an LCD device according to an embodiment of the present invention.

FIG. 4 is a view illustrating an LCD device according to an embodiment of the present invention.

Referring to FIG. 4, the LCD device according to an embodiment of the present invention includes a liquid crystal panel 100 in which a plurality of pixels are arranged in a matrix type, a plurality of driving ICs 400 for driving the liquid crystal panel 100, a printed circuit board (PCB) 300 on which a control unit supplying a control signal for driving the plurality of driving ICs 400 and a power supply generating driving power are mounted. Also, the LCD device includes a backlight unit that supplies light to the liquid crystal panel 100 and a bezel and an external case that are provided to surround the liquid crystal panel 100 and a driving circuit unit.

Figure 5:
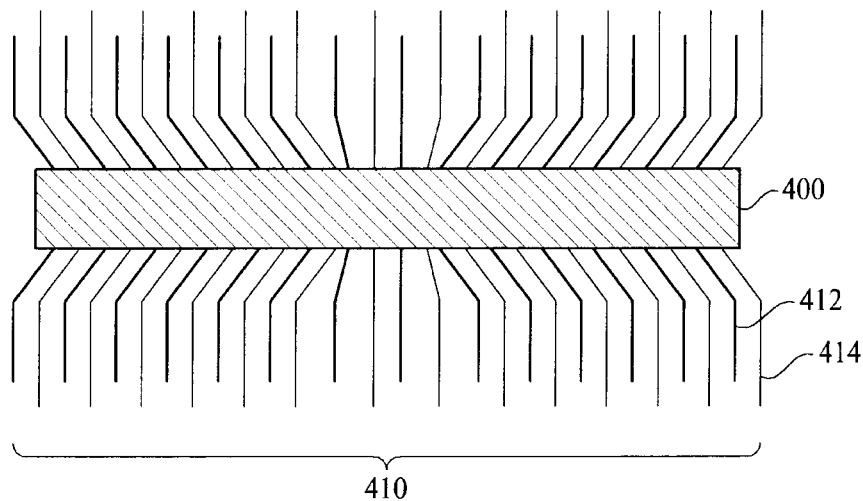
FIGS. 5(A) and 5(B) illustrate a driving IC of the LCD device according to an embodiment of the present invention.
Figure 5:
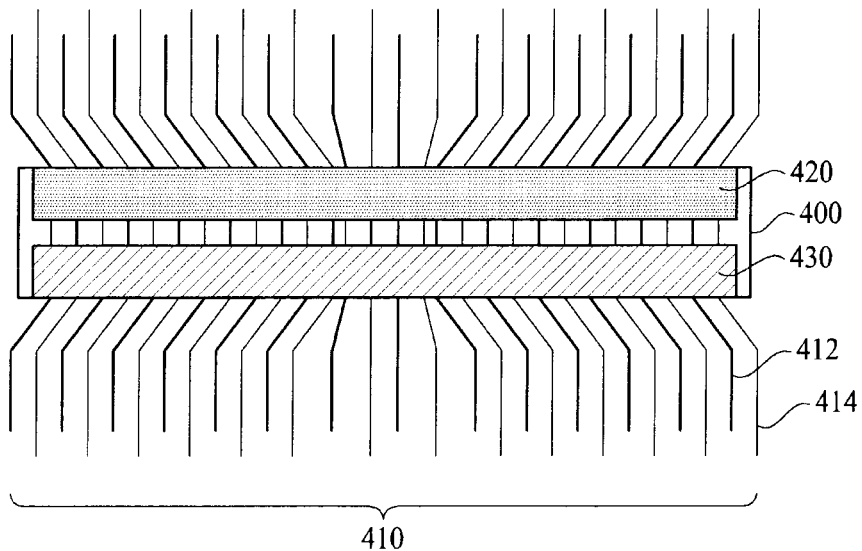

FIG. 5 illustrates a driving IC of the LCD device according to an embodiment of the present invention. In FIG. 5, one of the plurality of driving ICs 400 is illustrated. The plurality of driving ICs 400 may be provided in a chip-on glass (COG) type or a chip-on film (COF, chip-on flexible printed circuit) type.

Referring to FIG. 5A, in the driving IC 400 of the LCD device according to an embodiment of the present invention, a gate driving logic and a data driving logic are merged into one chip.

Referring to FIG. 5B, in the driving IC 400 of the LCD device according to an embodiment of the present invention, a data driving IC 420 and a gate driving IC 430 are merged into one chip.

The data driving logic or the data driving IC 420 generates analog data voltages supplied to the respective pixels by using a data control signal and digital image data which are applied from the control unit mounted on the PCB 300.

The gate driving logic or the gate driving IC 430 generates a scan signal (gate signal) for turning on a plurality of TFTs formed in the respective pixels, by using a gate control signal applied from the control unit mounted on the PCB 300.

A plurality of link lines 410 are formed at both sides of the driving IC 400. Here, the plurality of link lines 410 include a plurality of gate link lines 412 and a plurality of data link lines 414.

The driving IC 400 receives the gate signal from the control unit through the plurality of gate link lines 412, and generates the scan signal on the basis of the gate signal. The driving IC 400 supplies the generated scan signal to the pixels formed in the liquid crystal panel 100.

Moreover, the driving IC 400 receives the data control signal and the digital image data from the control unit through the data link lines 414, and generates analog data voltages on the basis of the data control signal and the digital image data. The driving IC 400 supplies the generated analog data voltages to the pixels formed in the liquid crystal panel 100.

The number of data lines DL formed in the liquid crystal panel 100 is not necessarily equal to that of first gate lines (VGL, vertical gate lines), and therefore, the number of gate link lines 412 is not equal to that of data link lines 414, and the gate link lines 412 and the data link lines 414 are not alternately disposed. For example, two data link lines 414 may be provided in correspondence with one gate link line 412 depending on pitches and resolution of the pixels.

Hereinafter, a structure of pixels and lines which are formed at the liquid crystal panel 100 of the present invention will be described in detail with reference to the drawing.

Figure 6:
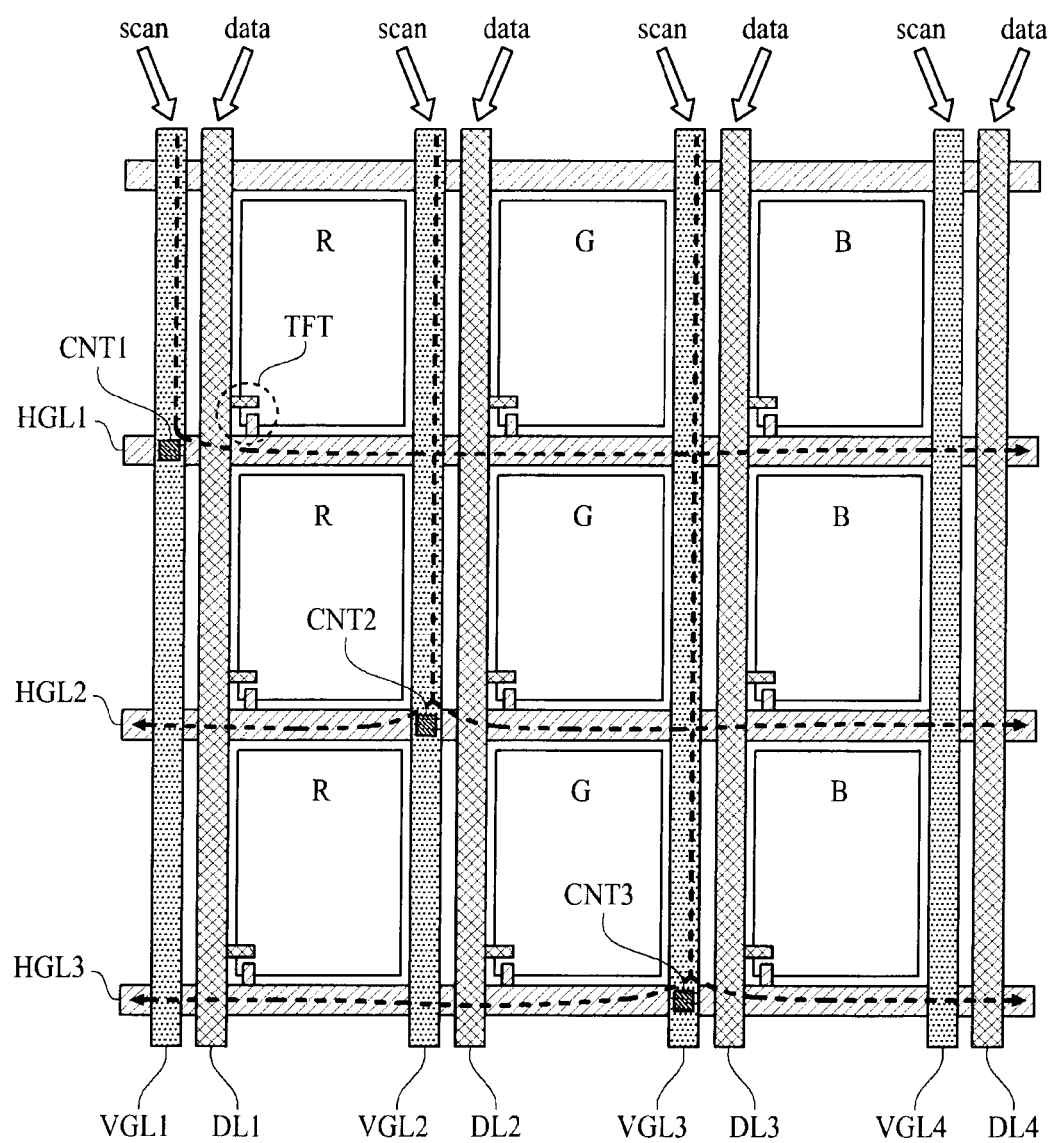
FIG. 6 is a view illustrating a pixel structure of an LCD device according to an embodiment of the present invention.

FIG. 6 is a view illustrating a pixel structure of an LCD device according to an embodiment of the present invention, and FIGS. 7(A) and 7(B) describe a left bezel size and right bezel size of the LCD device according to an embodiment of the present invention.

Figure 7:
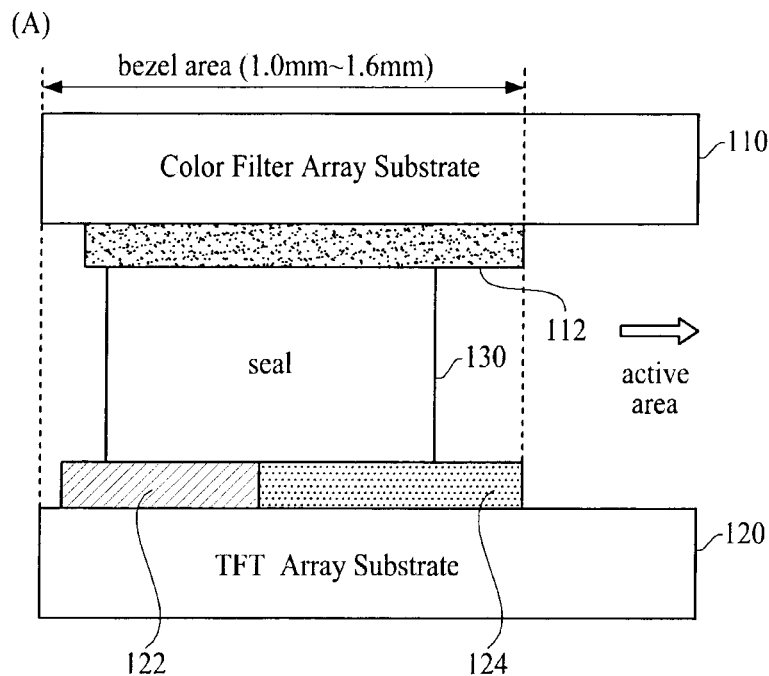
FIGS. 7(A) and 7(B) describe a left bezel size and right bezel size of the LCD device according to an embodiment of the present invention.
Figure 7:
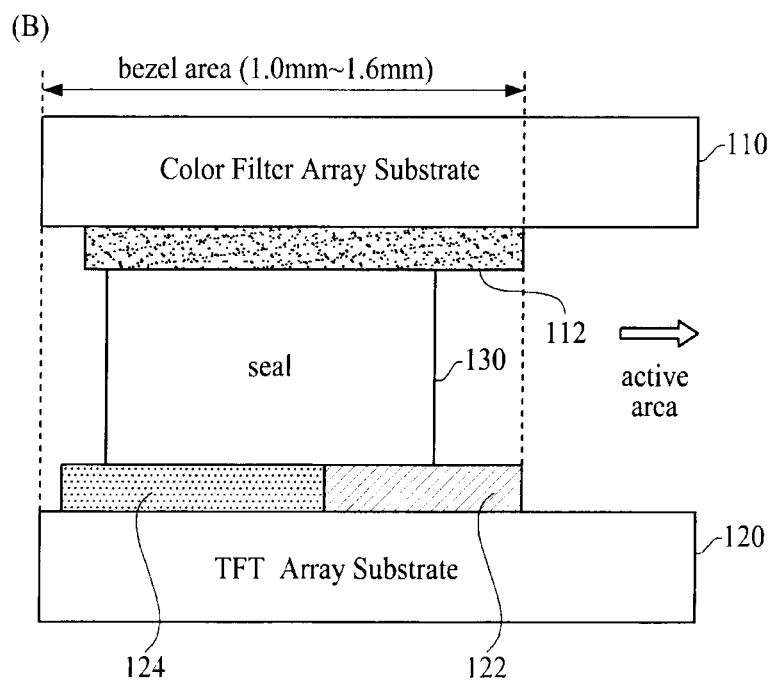

Referring to FIGS. 6 and 7, the liquid crystal panel 100 includes an upper substrate (color filter array substrate) 110, a lower substrate (TFT array substrate) 120, and a liquid crystal layer disposed between the two substrates 110 and 120. The upper substrate 110 and the lower substrate 120 are coupled to each other with a sealant 130.

The upper substrate 110 of the liquid crystal panel 100 includes a plurality of red (R), green (G), and blue (B) color filters for displaying a color image, and a black matrix (BM) that is formed between adjacent pixels to divide the pixels. Here, the black matrix (BM) is formed in plurality. In FIG. 7, a left non-display area of the liquid crystal panel 100 is illustrated, and thus, the color filters formed in an active area are not shown.

The lower substrate 120 of the liquid crystal panel 100 includes a display area (active area) in which the plurality of pixels for displaying an image are formed, and a non-display area in which a plurality of link lines linking the plurality of driving ICs 400 to the pixels are formed.

A plurality of vertical gate lines VGL, a plurality of horizontal gate lines HGL, and a plurality of data lines DL are formed in the active area of the lower substrate 120. The plurality of pixels are defined by the plurality of vertical gate lines VGL, the plurality of horizontal gate lines HGL, and the plurality of data lines DL.

Each of the pixels includes a common electrode that receives a common voltage (Vcom), a pixel electrode that receives data voltage (Vdata), a storage capacitor (Cst), and a TFT that is a switching element.

Here, an active layer of the TFT may be formed of amorphous silicon (a-Si), low temperature poly silicon (LTPS), or indium gallium zinc oxide (IGZO).

The LCD device including the above-described elements changes alignment of liquid crystal with an electric field generated between paired pixel electrode and common electrode, and adjusts a transmittance of light supplied from the backlight unit by aligning the liquid crystal, thereby displaying an image.

As illustrated in FIGS. 4 and 5, the driving IC 400 in which the gate driving IC (or gate driving logic) and the data driving IC (or data driving logic) are merged into one chip is disposed at an upper side (or lower side) of the liquid crystal panel 100.

Therefore, the present invention applies a new gate line structure, for supplying the scan signal to the pixels of the liquid crystal panel 100. In FIG. 4, the driving IC 400 is illustrated as being disposed at the upper side of the liquid crystal panel 100, but is not limited thereto. As another example, the driving IC 400 may be disposed at the lower side of the liquid crystal panel 100.

As illustrated in FIG. 6, the plurality of vertical gate lines VGL and the plurality of data lines DL are formed in parallel along a vertical direction in the liquid crystal panel 100. That is, the plurality of vertical gate lines VGL are formed in parallel and in the same direction as the plurality of data lines DL.

The plurality of horizontal gate lines HGL are formed in a horizontal direction in the liquid crystal panel 100. Therefore, the plurality of horizontal gate lines HGL and the plurality of vertical gate lines VGL are formed to intersect each other. In addition, the plurality of horizontal gate lines HGL and the plurality of data lines DL are formed to intersect each other.

To provide a detailed description, the plurality of vertical gate lines VGL and the plurality of data lines are vertically formed from an upper side to a lower side (or from the lower side to the upper side) across a short-axis direction of the liquid crystal panel 100. The plurality of horizontal gate lines HGL are horizontally formed from a left side to a right side (or from the right side to the left side) across a long-axis direction of the liquid crystal panel 100.

In the LCD device according to an embodiment of the present invention, the vertically formed plurality of vertical gate lines VGL and the plurality of horizontal gate lines HGL are formed in the same number in one-to-one correspondence relationship.

Here, the plurality of horizontal gate lines HGL are disposed on a first layer, and the plurality of vertical gate lines VGL and the plurality of data lines DL are disposed on a second layer. In addition, the plurality of vertical gate lines VGL and the plurality of data lines DL are disposed on the same layer.

The plurality of vertical gate lines VGL and the plurality of horizontal gate lines HGL are disposed on different layers with an insulating layer therebetween. The plurality of vertical gate lines VGL and the plurality of horizontal gate lines HGL are selectively brought into contact with each other through a contact CNT in an overlapping area therebetween. That is, the plurality of vertical gate lines VGL and the plurality of horizontal gate lines HGL are electrically connected to each other in pairs through the contact CNT in the overlapping area therebetween.

Specifically, a first vertical gate line VGL1 and a first horizontal gate line HGL1 are electrically connected to each other through a first contact CNT1 in an interesting (or overlapping) area therebetween. A second vertical gate line VGL2 and a second horizontal gate line HGL2 are electrically connected to each other through a second contact CNT2 in an interesting area therebetween. Also, a third vertical gate line VGL3 and a third horizontal gate line HGL3 are electrically connected to each other through a third contact CNT3 in an interesting area therebetween. Similarly, N number of vertical gate lines VGL and N number of horizontal gate lines HGL are paired and electrically connected to each other in one-to-one correspondence relationship through a contact.

For another example, the vertical gate lines VGL and the horizontal gate lines HGL may be directly connected to each other in an intersecting area therebetween, or may be indirectly connected to each other by using a third layer.

Hereinabove, the vertical gate lines VGL and the horizontal gate lines HGL have been described as being provided of the same number, which is relevant to one of various embodiments of the present invention. In another embodiment of the present invention, N number of horizontal gate lines and M×N (where M is an integer equal to or more than two) number of vertical gate lines may be provided.

In FIG. 6, it is illustrated that the pixels have a single domain and a square and rectangular shape, but the pixels may be formed to have a multi-domain without being limited thereto. Further, the vertical gate lines VGL, the horizontal gate lines HGL, and the data lines may be provided in a diagonal direction.

To provide a description with reference to FIGS. 5 and 6, the plurality of gate link lines 412 connected to the driving IC 400 are electrically connected to the plurality of vertical gate lines VGL.

The scan signal (a gate driving signal) outputted from the driving IC 400 is applied to the plurality of vertical gate lines VGL.

Since the vertical gate lines VGL are electrically connected to the horizontal gate lines HGL, the scan signal is applied to the plurality of horizontal gate lines HGL connected to the plurality of vertical gate lines VGL.

The scan signal applied to the horizontal gate lines HGL is supplied to the respective TFTs of the plurality of pixels formed at the liquid crystal panel 100, thereby turning on the TFTs. At this time, the scan signal is supplied to all the pixels of the liquid crystal panel, in which case the scan signal is sequentially supplied in units of one horizontal gate line.

The plurality of data link lines 414 connected to the driving IC 400 are electrically connected to the plurality of data lines. Data voltages (Vdata) outputted from the driving IC 400 are respectively applied to the plurality of data lines. The data voltages (Vdata) applied to the respective data lines are supplied to respective sources of the TFTs, and when each of the TFTs is turned on, the data voltage (Vdata) supplied to each of the sources is supplied to a corresponding pixel electrode via a corresponding drain.

For example, the driving IC 400 in which the gate driving IC and the data driving IC are merged into one chip is disposed at the upper side (or the lower side) of the liquid crystal panel 100.

For example, the driving IC 400 in which the gate driving logic and the data driving logic are merged into one chip is disposed at the upper side (or the lower side) of the liquid crystal panel 100.

The scan signal is applied to the TFT of a corresponding pixel through a corresponding vertical gate line VGL and horizontal gate line HGL, and a data voltage (Vdata) is applied to the pixel electrode of the pixel through a corresponding data line. Therefore, a link line and a GIP logic can be removed from the left and right non-display areas of the related art liquid crystal panel.

As illustrated in FIGS. 7(A) and 7(B), only a common voltage link area 122 is formed in the left non-display area of the liquid crystal panel 100, and only a ground link area 124 is formed in the right non-display area of the liquid crystal panel 100, thus decreasing a bezel width to 1.0 mm to 1.6 mm.

Specifically, as illustrated FIG. 7A, the common voltage link area 122 and the ground link area 124 may be formed to overlap the sealant 130. In this case, the common voltage link area 122 may be disposed more outward from the liquid crystal panel than the ground link area 124.

For another example, as illustrated FIG. 7B, the common voltage link area 122 and the ground link area 124 may be formed to overlap the sealant 130. In this case, the ground link area 124 may be disposed more outward from the liquid crystal panel than the common voltage link area 122.

As described above, the link areas 122 and 124 are formed to overlap the sealant 130 and moreover have a minimum of bezel width margin which is necessary to couple the upper substrate 110 and the lower substrate 120, thereby realizing a narrow bezel.

Figure 8:
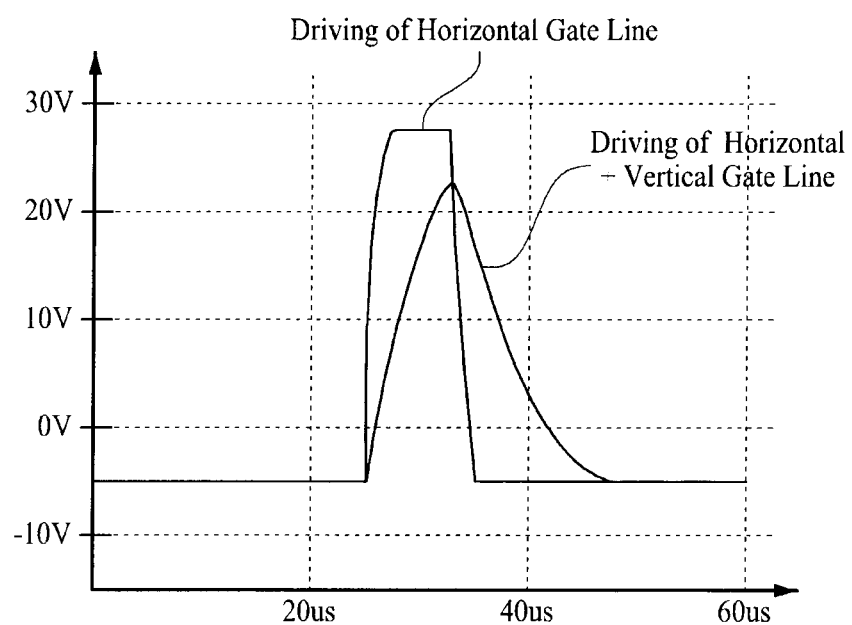
FIG. 8 is a view showing that a gate driving signal is delayed due to a large size of a liquid crystal panel and application of horizontal gate lines and vertical gate lines.

FIG. 8 is a view showing that a gate driving signal is delayed due to a large size of the liquid crystal panel and application of the horizontal gate lines and vertical gate lines.

Referring to FIG. 8, a general LCD device supplies the scan signal to the respective TFTs by using a plurality of horizontally formed gate lines. On the other hand, the LCD device of the present invention supplies the scan signal to the TFTs through the vertical gate lines VGL and the horizontal gate line HGL.

For this reason, in the present invention, a length of each gate line increases, and a path through which the scan signal is transferred becomes longer, causing delay of the scan signal and drop of a voltage. Also, as the liquid crystal panel is enlarged in size, the delay of the scan signal increases, and the liquid crystal panel cannot normally be driven.

To solve such problems, the vertical gate lines VGL come into multi-contact with the horizontal gate lines HGL at a plurality of points, and the scan signal is supplied in a multi-feeding system. Hereinafter, a specific example of the multi-contact of the vertical gate lines VGL and horizontal gate lines HGL and a multi-feeding method of the scan signal will be described in detail.

The LCD device of the present invention includes N number of horizontal gate lines and M×N (where M is an integer equal to or more than two) number of vertical gate lines.

Figure 9:
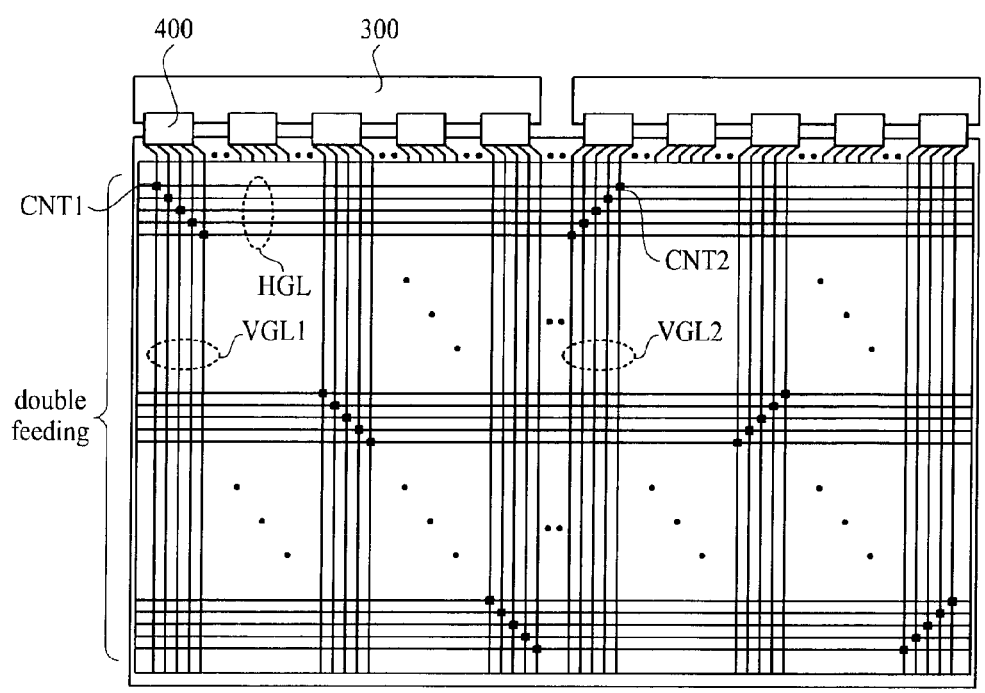
FIG. 9 is a view illustrating a first embodiment for multi-feeding the gate driving signal.

FIG. 9 is a view illustrating a first embodiment for multi-feeding the gate driving signal. In FIG. 9, an example is illustrated in which two vertical gate lines come into contact with one horizontal gate line, and the scan signal is applied to the TFTs of the pixels in a double feeding system.

Referring to FIG. 9, the scan signal may be supplied to one horizontal gate line HGL by the double feeding system. To this end, N number of horizontal gate lines HGL and 2N number of vertical gate lines VGL are formed at the liquid crystal panel.

Here, channels of a driving IC are configured with a plurality of gate driving channels for outputting the scan signal and a plurality of data driving channels for outputting data voltages.

The gate driving channels of the driving IC are arranged at an upper side of the liquid crystal panel, and connected to the respective vertical gate lines. Further, the data driving channels of the driving IC are arranged at the upper side of the liquid crystal panel, and connected to the respective data lines.

Specifically, the vertical gate lines VGL whose number is equal to two times the number of horizontal gate lines HGL are provided for supplying the scan signal to one horizontal gate line HGL in the double feeding system.

One horizontal gate line HGL and two vertical gate lines VGL are electrically connected to each other by using two contacts.

The scan signal is outputted from two gate driving channels provided at the driving IC at the same time, and thus, the same scan signal is applied to two vertical gate lines VGL.

Therefore, the scan signal which is simultaneously applied to the two vertical gate lines VGL is applied to one horizontal gate line HGL, and is supplied to the TFTs of pixels connected to the one horizontal gate lines HGL.

first and second vertical gate lines VGL1 and VGL2 connected to one horizontal gate line HGL are disposed at certain intervals in the liquid crystal panel such that a time, when the scan signal is applied to the TFTs of pixels formed on one horizontal line, becomes uniform without being biased.

A horizontal gate line HGL and a first vertical gate line VGL1, which are provided at an upper end portion of the liquid crystal panel, are connected to each other through a first contact at a left side portion of the liquid crystal panel. In addition, the horizontal gate line HGL and the second vertical gate line VGL2 are connected to each other through a second contact at a central portion of the liquid crystal panel.

A horizontal gate line HGL and a first vertical gate line VGL1, which are provided at the central portion of the liquid crystal panel, are connected to each other through the first contact between the left side portion and central portion of the liquid crystal panel. In addition, the horizontal gate line HGL and the second vertical gate line VGL2 are connected to each other through the second contact between the central portion and a right side portion of the liquid crystal panel.

A horizontal gate line HGL and a first vertical gate line VGL1, which are provided at a lower end portion of the liquid crystal panel, are connected to each other through the first contact at the right side portion of the liquid crystal panel. In addition, the horizontal gate line HGL and the second vertical gate line VGL2 are connected to each other through the second contact at the central portion of the liquid crystal panel.

As described above, one horizontal gate line and two vertical gate lines are connected to each other, and when the same scan signal is respectively outputted from two gate driving channels to two vertical gate lines at the same time, the scan signal is supplied to one horizontal gate line by the double feeding system.

Figure 10:
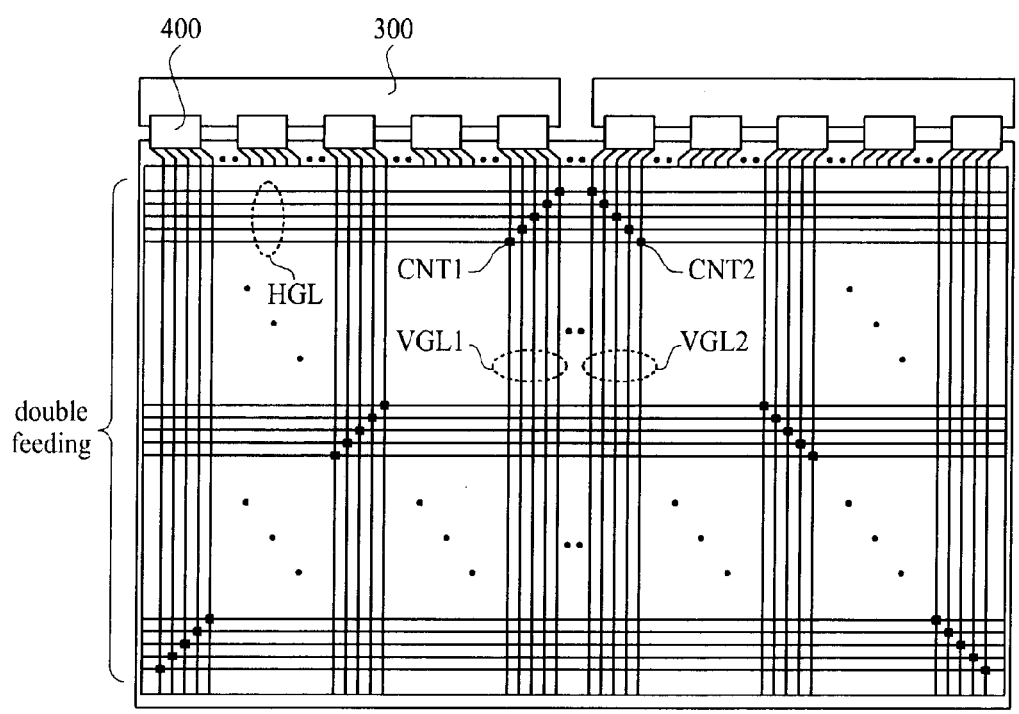
FIG. 10 is a view illustrating a second embodiment for multi-feeding the gate driving signal.

FIG. 10 is a view illustrating a second embodiment for multi-feeding the gate driving signal. In FIG. 10, another example is illustrated in which two vertical gate lines come into contact with one horizontal gate line, and the scan signal is applied to the TFTs of the pixels in a double feeding system.

Referring to FIG. 10, the scan signal may be supplied to one horizontal gate line HGL by the double feeding system. To this end, N number of horizontal gate lines HGL and 2N number of vertical gate lines VGL are formed at the liquid crystal panel.

Specifically, the vertical gate lines VGL whose number is equal to two times the number of horizontal gate lines HGL are provided for supplying the scan signal to one horizontal gate line HGL in the double feeding system.

One horizontal gate line HGL and two vertical gate lines VGL are electrically connected to each other by using two contacts.

The scan signal is simultaneously outputted from two gate driving channels provided at the driving IC, and thus, the same scan signal is applied to two vertical gate lines VGL at the same time.

Therefore, the scan signal which is simultaneously applied to the two vertical gate lines VGL is applied to one horizontal gate line HGL, and is supplied to the TFTs of pixels connected to the one horizontal gate lines HGL.

A plurality of first and second vertical gate lines VGL1 and VGL2 connected to one horizontal gate line HGL are disposed at certain intervals in the liquid crystal panel such that a time, when the scan signal is applied to the TFTs of pixels formed on one horizontal line, becomes uniform without being biased.

Here, a horizontal gate line HGL and a first vertical gate line VGL1, which are provided at an upper end portion of the liquid crystal panel, are connected to each other through a first contact at a central portion of the liquid crystal panel. In addition, the horizontal gate line HGL and the second vertical gate line VGL2 are connected to each other through a second contact at the central portion of the liquid crystal panel.

A horizontal gate line HGL and a first vertical gate line VGL1, which are provided at the central portion of the liquid crystal panel, are connected to each other through the first contact between a left side portion and the central portion of the liquid crystal panel. In addition, the horizontal gate line HGL and the second vertical gate line VGL2 are connected to each other through the second contact between the central portion and a right side portion of the liquid crystal panel.

A horizontal gate line HGL and a first vertical gate line VGL1, which are provided at a lower end portion of the liquid crystal panel, are connected to each other through the first contact at the left side portion of the liquid crystal panel. In addition, the horizontal gate line HGL and the second vertical gate line VGL2 are connected to each other through the second contact at the right side portion of the liquid crystal panel.

As described above, one horizontal gate line and two vertical gate lines are connected to each other, and when the same scan signal is respectively outputted from two gate driving channels to two vertical gate lines, the scan signal is supplied to one horizontal gate line by the double feeding system.

Figure 11:
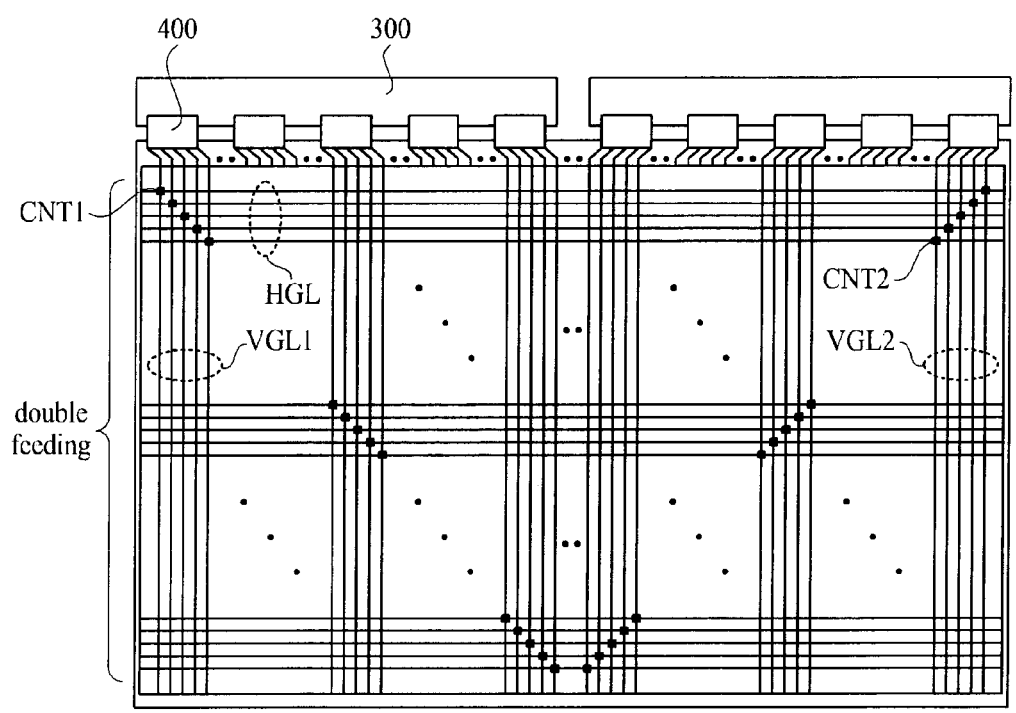
FIG. 11 is a view illustrating a third embodiment for multi-feeding the gate driving signal.

FIG. 11 is a view illustrating a third embodiment for multi-feeding the gate driving signal. In FIG. 11, another example is illustrated in which two vertical gate lines come into contact with one horizontal gate line, and the scan signal is applied to the TFTs of the pixels in a double feeding system.

Referring to FIG. 11, the scan signal may be supplied to one horizontal gate line HGL by the double feeding system. To this end, N number of horizontal gate lines HGL and 2N number of vertical gate lines VGL are formed at the liquid crystal panel.

Specifically, the vertical gate lines VGL whose number is equal to two times the number of horizontal gate lines HGL are provided for supplying the scan signal to one horizontal gate line HGL in the double feeding system.

One horizontal gate line HGL and two vertical gate lines VGL are electrically connected to each other by using two contacts.

The scan signal is simultaneously outputted from two gate driving channels provided at the driving IC, and thus, the same scan signal is applied to two vertical gate lines VGL.

Therefore, the scan signal which is simultaneously applied to the two vertical gate lines VGL is applied to one horizontal gate line HGL, and is supplied to the TFTs of pixels connected to the one horizontal gate lines HGL.

First and second vertical gate lines VGL1 and VGL2 connected to one horizontal gate line HGL are disposed at certain intervals in the liquid crystal panel such that a time, when the scan signal is applied to the TFTs of pixels formed on one horizontal line, becomes uniform without being biased.

Here, a horizontal gate line HGL and a first vertical gate line VGL1, which are provided at an upper end portion of the liquid crystal panel, are connected to each other through a first contact at a left side portion of the liquid crystal panel. In addition, the horizontal gate line HGL and the second vertical gate line VGL2 are connected to each other through a second contact at a right side portion of the liquid crystal panel.

A horizontal gate line HGL and a first vertical gate line VGL1, which are provided at the central portion of the liquid crystal panel, are connected to each other through the first contact between a left side portion and the central portion of the liquid crystal panel. In addition, the horizontal gate line HGL and the second vertical gate line VGL2 are connected to each other through the second contact between the central portion and a right side portion of the liquid crystal panel.

A horizontal gate line HGL and a first vertical gate line VGL1, which are provided at a lower end portion of the liquid crystal panel, are connected to each other through the first contact at the central portion of the liquid crystal panel. In addition, the horizontal gate line HGL and the second vertical gate line VGL2 are connected to each other through the second contact at the central portion of the liquid crystal panel.

As described above, one horizontal gate line and two vertical gate lines are connected to each other, and when the same scan signal is respectively outputted from two gate driving channels to two vertical gate lines at the same time, the scan signal is supplied to one horizontal gate line by the double feeding system.

As illustrated in FIGS. 9 to 11, by using the double feeding system, the scan signal for turning on the TFTs of the respective pixels can be stably supplied, and a time for which the scan signal is supplied to each pixel can be reduced by half (½) compared to a single feeding system. By using the double contact structure of the vertical gate lines and horizontal gate lines, left and right bezel sizes of the liquid crystal panel can decrease, and moreover, delay of a signal, drop of a voltage, and a charging defect of a pixel voltage due to extension of the gate lines can be prevented.

Figure 12:
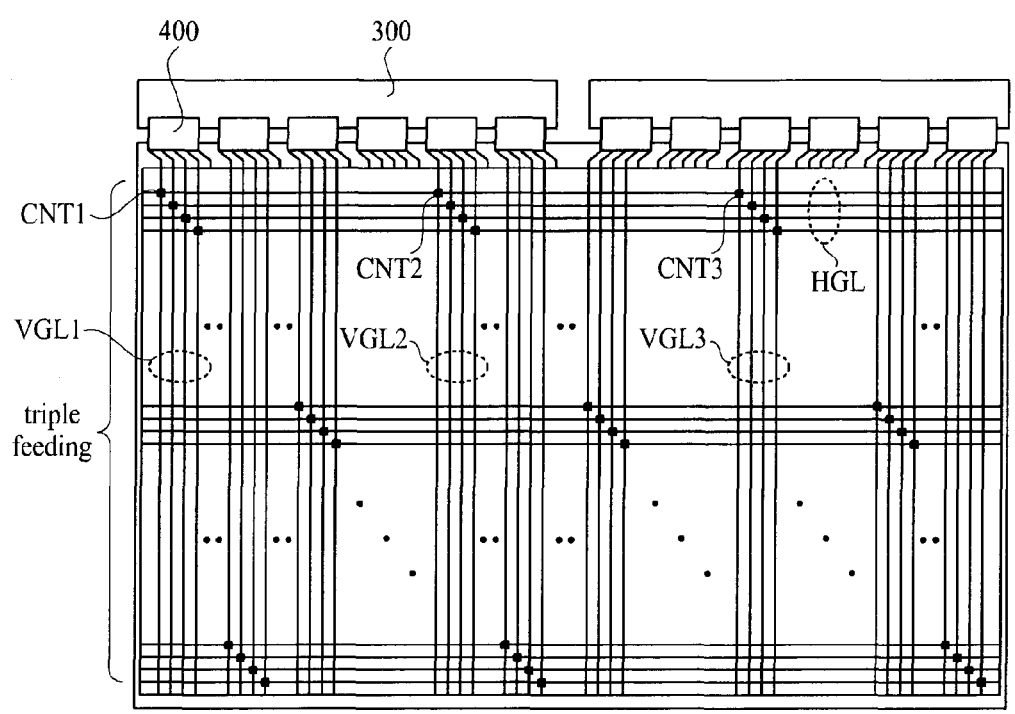
FIG. 12 is a view illustrating a fourth embodiment for multi-feeding the gate driving signal.

FIG. 12 is a view illustrating a fourth embodiment for multi-feeding the gate driving signal. In FIG. 12, another example is illustrated in which three vertical gate lines come into contact with one horizontal gate line, and the scan signal is applied to the TFTs of the pixels in a triple feeding system.

Referring to FIG. 12, the scan signal may be supplied to one horizontal gate line HGL by the triple feeding system. To this end, N number of horizontal gate lines HGL and 3N number of vertical gate lines VGL are formed at the liquid crystal panel.

Specifically, the vertical gate lines VGL whose number is equal to three times the number of horizontal gate lines HGL are provided for supplying the scan signal to one horizontal gate line HGL in the triple feeding system.

One horizontal gate line HGL and three vertical gate lines VGL are electrically connected to each other by using three contacts.

The scan signal is simultaneously outputted from three gate driving channels provided at the driving IC, and thus, the same scan signal is applied to three vertical gate lines VGL at the same time.

Therefore, the scan signal which is simultaneously applied to the three vertical gate lines VGL is applied to one horizontal gate line HGL, and is supplied to the TFTs of pixels connected to the one horizontal gate lines HGL.

First to third vertical gate lines VGL1 to VGL3 connected to one horizontal gate line HGL are disposed at certain intervals in the liquid crystal panel such that a time, when the scan signal is applied to the TFTs of pixels formed on one horizontal line, becomes uniform without being biased.

The horizontal gate line HGL and the first vertical gate line VGL1 are connected to each other through a first contact, the horizontal gate line HGL and the first vertical gate line VGL2 are connected to each other through a second contact, and the horizontal gate line HGL and the third vertical gate line VGL3 are connected to each other through a third contact.

As described above, one horizontal gate line and three vertical gate lines are connected to each other, and when the same scan signal is respectively outputted from three gate driving channels to three vertical gate lines at the same time, the scan signal is supplied to one horizontal gate line by the triple feeding system.

As illustrated in FIG. 12, by using the triple feeding system, the scan signal for turning on the TFTs of the respective pixels can be stably supplied, and a time for which the scan signal is supplied to each pixel can be reduced to ⅓ compared to a single feeding system. By using the triple contact structure of the vertical gate lines and horizontal gate lines, the left and right bezel sizes of the liquid crystal panel can decrease, and moreover, delay of a signal, drop of a voltage, and a charging defect of a pixel voltage due to extension of the gate lines can be prevented.

Figure 13:
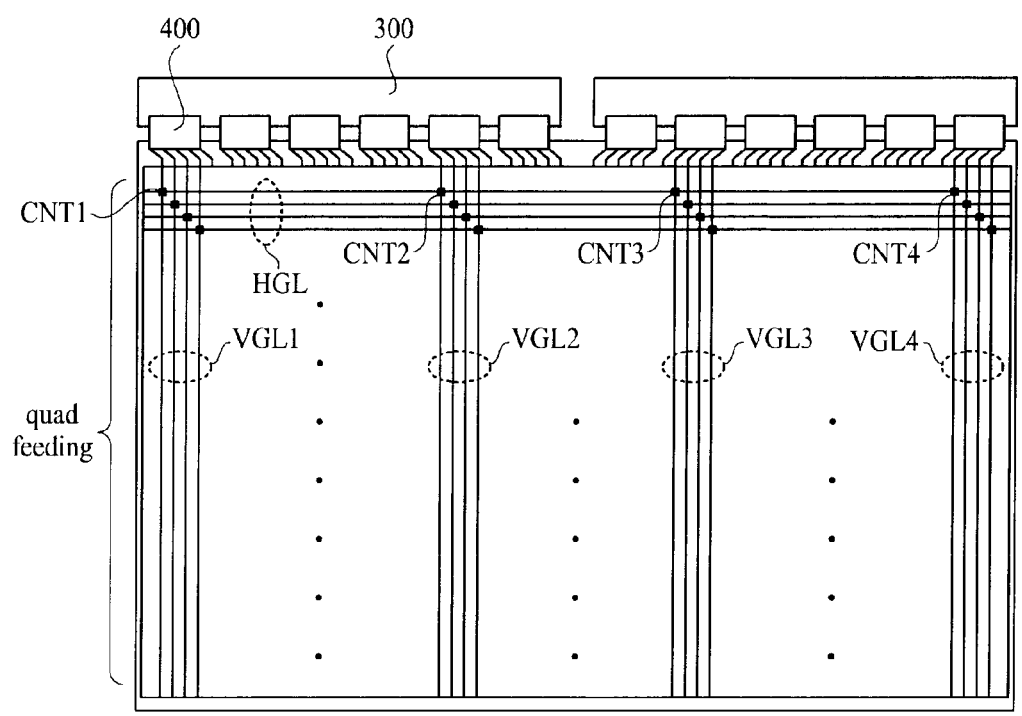
FIG. 13 is a view illustrating a fifth embodiment for multi-feeding the gate driving signal.

FIG. 13 is a view illustrating a fifth embodiment for multi-feeding the gate driving signal. In FIG. 13, another example is illustrated in which four vertical gate lines come into contact with one horizontal gate line, and the scan signal is applied to the TFTs of the pixels in a quad feeding system.

Referring to FIG. 13, the scan signal may be supplied to one horizontal gate line HGL by the quad feeding system. To this end, N number of horizontal gate lines HGL and 4N number of vertical gate lines VGL are formed at the liquid crystal panel.

Specifically, the vertical gate lines VGL whose number is equal to four times the number of horizontal gate lines HGL are provided for supplying the scan signal to one horizontal gate line HGL in the quad feeding system.

One horizontal gate line HGL and four vertical gate lines VGL are electrically connected to each other by using four contacts.

The scan signal is simultaneously outputted from four gate driving channels provided at the driving IC, and thus, the same scan signal is applied to four vertical gate lines VGL at the same time.

Therefore, the scan signal which is simultaneously applied to the four vertical gate lines VGL is applied to one horizontal gate line HGL, and is supplied to the TFTs of pixels connected to the one horizontal gate lines HGL.

A plurality of first to fourth vertical gate lines VGL1 to VGL4 connected to one horizontal gate line HGL are disposed at certain intervals in the liquid crystal panel such that a time, when the scan signal is applied to the TFTs of pixels formed on one horizontal line, becomes uniform without being biased.

The horizontal gate line HGL and the first vertical gate line VGL1 are connected to each other through a first contact CNT1, the horizontal gate line HGL and the first vertical gate line VGL2 are connected to each other through a second contact CNT2, the horizontal gate line HGL and the third vertical gate line VGL3 are connected to each other through a third contact CNT3, and the horizontal gate line HGL and the fourth vertical gate line VGL4 are connected to each other through a fourth contact CNT4.

As described above, one horizontal gate line and four vertical gate lines are connected to each other, and when the same scan signal is respectively outputted from four gate driving channels to four vertical gate lines at the same time, the scan signal is supplied to one horizontal gate line by the quad feeding system.

As illustrated in FIG. 13, by using the quad feeding system, the scan signal for turning on the TFTs of the respective pixels can be stably supplied, and a time for which the scan signal is supplied to each pixel can be reduced to ¼ compared to a single feeding system. By using the triple contact structure of the vertical gate lines and horizontal gate lines, the left and right bezel sizes of the liquid crystal panel can decrease, and moreover, delay of a signal, drop of a voltage, and a charging defect of a pixel voltage due to extension of the gate lines can be prevented.

Figure 14:
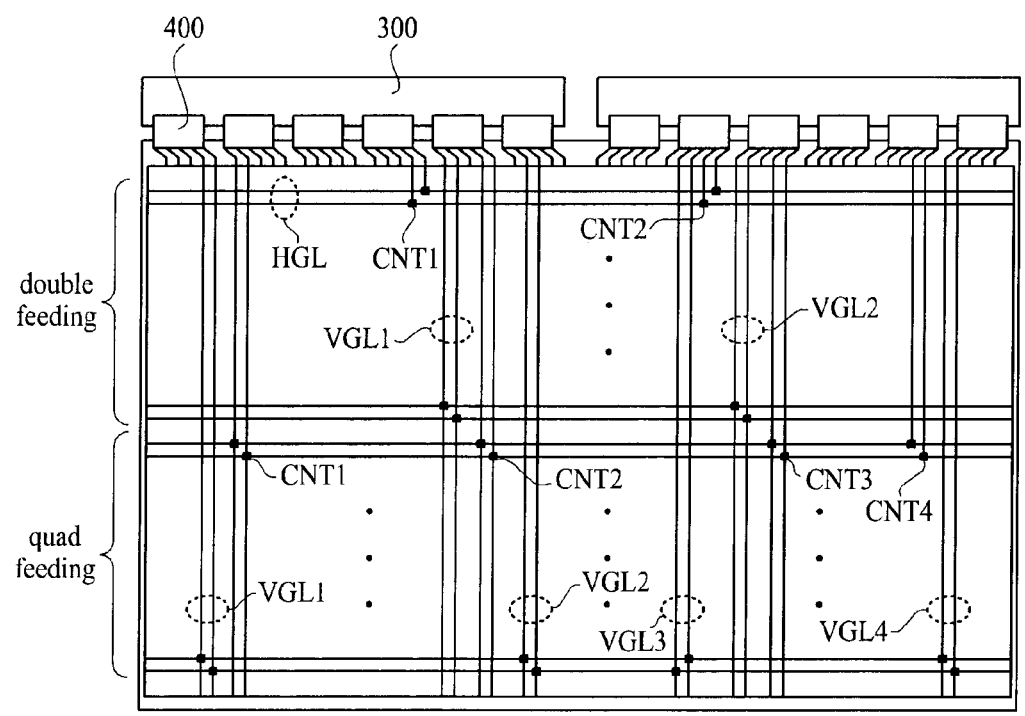
FIG. 14 is a view illustrating a sixth embodiment for multi-feeding the gate driving signal.
Figure 15:
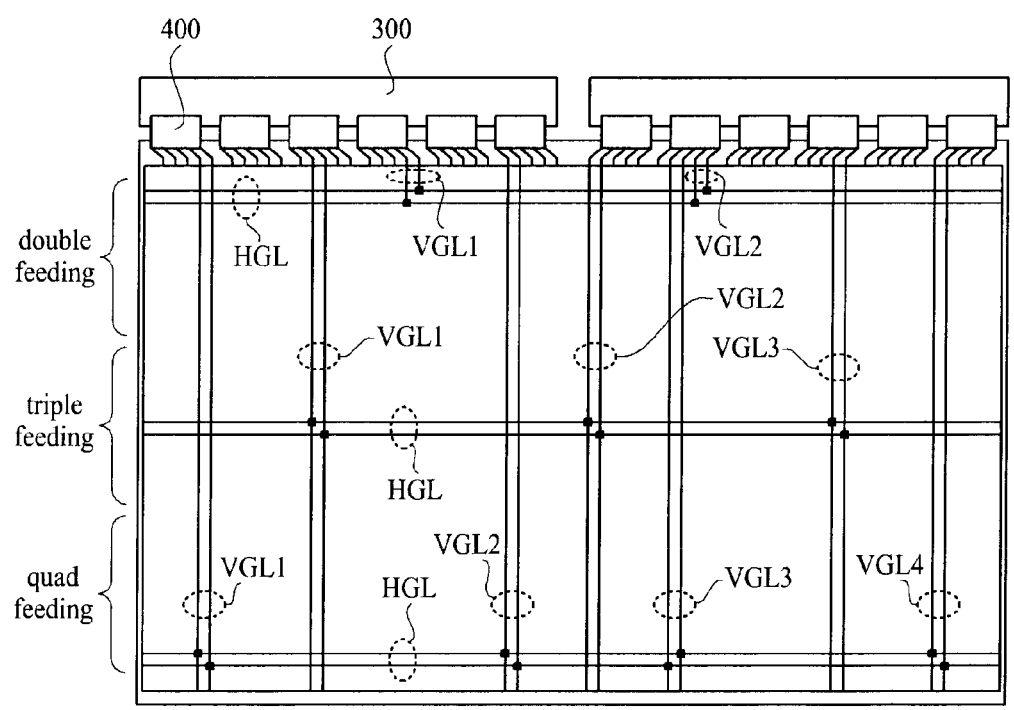
FIG. 15 is a view illustrating a seventh embodiment for multi-feeding the gate driving signal.

FIG. 14 is a view illustrating a sixth embodiment for multi-feeding the gate driving signal, and FIG. 15 is a view illustrating a seventh embodiment for multi-feeding the gate driving signal.

In FIGS. 14 and 15, an example is illustrated in which two to four vertical gate lines come into contact with one horizontal gate line, and the scan signal is applied to the TFTs of the pixels in the double feeding system, the triple feeding system, or the quad feeding system.

Referring to FIG. 14, first, the scan signal may be supplied to one horizontal gate line HGL by the double feeding system or the quad feeding system.

Here, the number of vertical gate lines connected to one horizontal gate line increases progressively from the upper end portion to the lower end portion of the liquid crystal panel, and the number of points in which a plurality of the scan signals are simultaneously supplied to one horizontal gate line increases with the progressive increasing of the number of vertical gate lines.

The same scan signal is simultaneously supplied from j number of channels (which are provided at the driving IC) to a plurality of horizontal gate lines which are provided at the upper end portion of the liquid crystal panel, and the same scan signal is simultaneously supplied from k number of channels (which are provided at the driving IC) to a plurality of horizontal gate lines which are provided at the lower end portion of the liquid crystal panel. That is, the number of channels of the driving IC which supply the scan signal to the horizontal gate lines increases progressively from the upper end portion to the lower end portion of the liquid crystal panel.

Here, horizontal gate lines provided at the upper end portion with respect to the center of the liquid crystal panel are respectively connected to two vertical gate lines. Further, horizontal gate lines provided at the lower end portion with respect to the center of the liquid crystal panel are respectively connected to four vertical gate lines.

To this end, N number of horizontal gate lines HGL are provided at the liquid crystal panel, 2N number of vertical gate lines VGL connected to horizontal gate lines which are provided at the upper end portion of the liquid crystal panel are provided, and 4N number of vertical gate lines VGL connected to horizontal gate lines which are provided at the lower end portion of the liquid crystal panel are provided.

To provide a description with reference to FIG. 15, the scan signal may be supplied to one horizontal gate line HGL by the double feeding system, the triple feeding system, or the quad feeding system.

Here, two horizontal gate lines provided at the upper end portion of the liquid crystal panel are respectively connected to two vertical gate lines. Horizontal gate lines HGL provided at the central portion of the liquid crystal panel are respectively connected to three vertical gate lines. Horizontal gate lines HGL provided at the lower end portion of the liquid crystal panel are respectively connected to four vertical gate lines.

To this end, N number of horizontal gate lines HGL are provided at the liquid crystal panel, 2N number of vertical gate lines VGL connected to horizontal gate lines which are provided at the upper end portion of the liquid crystal panel are provided, 3N number of vertical gate lines VGL connected to horizontal gate lines which are provided at the central portion of the liquid crystal panel are provided, and 4N number of vertical gate lines VGL connected to horizontal gate lines which are provided at the lower end portion of the liquid crystal panel are provided.

A horizontal gate line HGL and a first vertical gate line VGL1 are connected to each other through a first contact CNT1, a horizontal gate line HGL and a second vertical gate line VGL2 are connected to each other through a second contact CNT2, a horizontal gate line HGL and a third vertical gate line VGL3 are connected to each other through a third contact CNT3, and a horizontal gate line HGL and a fourth vertical gate line VGL4 are connected to each other through a fourth contact CNT4.

A plurality of the scan signals are simultaneously outputted from two to four gate driving channels provided at the driving IC, and thus, the same scan signal is applied to two to four vertical gate lines VGL at the same time.

Therefore, the scan signal which is simultaneously applied to the two to four vertical gate lines VGL is applied to one horizontal gate line HGL, and is supplied to the TFTs of pixels connected to the one horizontal gate lines HGL.

First to fourth vertical gate lines VGL1 to VGL4 connected to one horizontal gate line HGL are disposed at certain intervals in the liquid crystal panel such that a time, when the scan signal is applied to the TFTs of pixels formed on one horizontal line, becomes uniform without being biased.

As described above, one horizontal gate line and two to four vertical gate lines are connected to each other, and when the same scan signal is respectively outputted from two to four gate driving channels to two to four vertical gate lines at the same time, the scan signal is supplied to one horizontal gate line by the multi-feeding system.

As illustrated in FIGS. 14 and 15, by using the multi-feeding system, the scan signal for turning on the TFTs of the respective pixels can be stably supplied, and a time for which the scan signal is supplied to each pixel can be reduced to ½ to ¼ compared to a single feeding system. By using the multi-contact structure of the vertical gate lines and horizontal gate lines, the left and right bezel sizes of the liquid crystal panel can decrease, and moreover, delay of a signal, drop of a voltage, and a charging defect of a pixel voltage due to extension of the gate lines can be prevented.

Although not shown, in addition to the pixel structure of FIG. 6, a 2-data-line and 1-data-line (2DIG) pixel structure may use the vertical gate lines VGL and the horizontal gate lines HGL, and use a multi-contact for the vertical gate lines VGL and horizontal gate lines HGL, for multi-feeding.

Moreover, a double reduced data (DRD) pixel structure may use the vertical gate lines VGL and the horizontal gate lines HGL, and use the multi-contact for the vertical gate lines VGL and horizontal gate lines HGL for multi-feeding.

Here, the DRD pixel structure is a structure in which data voltages are respectively supplied to pixels (which are arranged in two rows) through one data line. In the DRD pixel structure, two pixels share one data line, and thus, two gate lines are applied for separately driving two pixels, namely, gate lines are provided by two times compared to vertical resolution.

Figure 16:
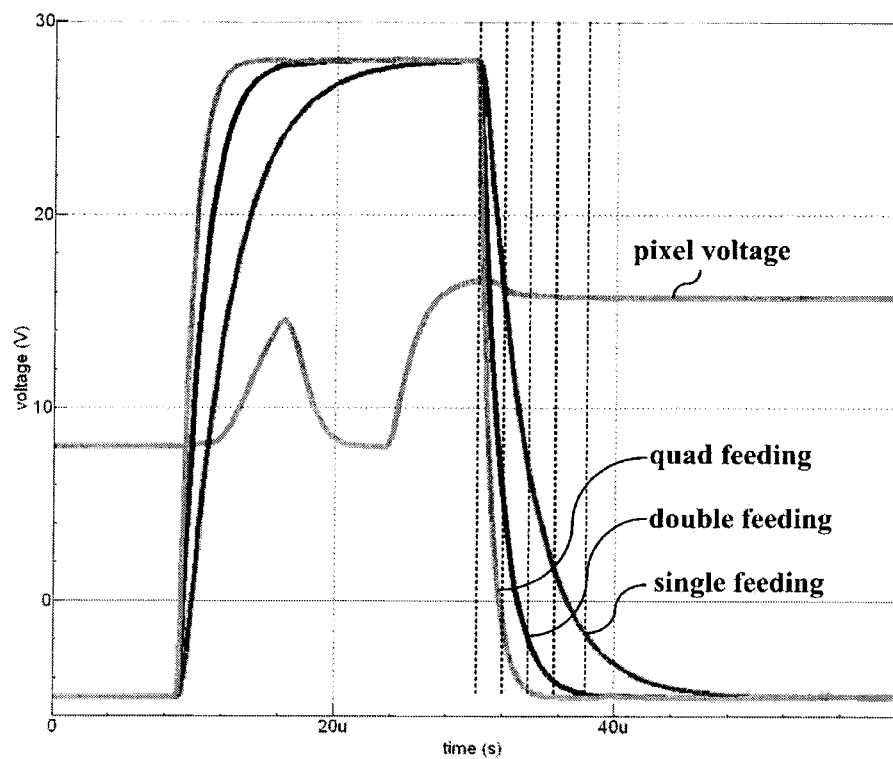
FIG. 16 is a view showing delay of the gate driving signal and a pixel charging ratio according to the multi-feeding of the gate driving signal.

FIG. 16 is a view showing delay of the gate driving signal (the scan signal) and a pixel charging ratio according to the multi-feeding of the gate driving signal.

Referring to FIG. 16, delay of the scan signal and a pixel charging ratio are compared between a case that supplies the scan signal in the single feeding system and a case that supplies the scan signal in the double feeding system and the quad feeding system according to the present invention. In the single feeding system, signal delay of 7.95 us occurs, and a pixel charging ratio of 98.69% is shown.

On the other hand, by using the double feeding system of the present invention, it can be seen that signal delay is reduced to 3.77 us, and the pixel charging ratio increase to 98.74%. Also, by using the quad feeding system of the present invention, it can be seen that signal delay is reduced to 2.16 us, and the pixel charging ratio increase to 98.78%.

The LCD device and the method of driving the same according to the embodiments of the present invention prevent the gate driving signal from being delayed due to the large size of the liquid crystal panel, thus enhancing a driving reliability and a display quality. Also, the charging time of the pixel voltage supplied to each pixel is sufficiently secured, thus increasing a driving stability.

Hereinabove, it has been described that a maximum of four vertical gate lines are connected to one horizontal gate line, and the scan signal is supplied to one horizontal gate line in the quad feeding system, but the present invention is not limited thereto.

In another embodiment of the present invention, five or more vertical gate lines may be connected to one horizontal gate line according to the size of the liquid crystal panel, and the scan signal may be supplied to one horizontal gate line in the multi-feeding system.

The LCD device and the method of driving the same according to the embodiments of the present invention prevent the gate driving signal from being delayed due to the large size of the liquid crystal panel, thus enhancing a driving reliability and a display quality.

In the LCD device according to the embodiments of the present invention, the size of the bezel formed at the outer portion of the liquid crystal panel can be reduced.

In the LCD device according to the embodiments of the present invention, an aesthetic design appearance can be enhanced.

In the LCD device according to the embodiments of the present invention, a narrow bezel and a borderless panel can be implemented such that the lower instrument, left instrument, and right instrument of the liquid crystal panel are not exposed to the front.

In the LCD device according to the embodiments of the present invention, an aperture ratio of each pixel increases, and the charging time of the pixel voltage supplied to each pixel is sufficiently secured, thus increasing a driving stability.

In the LCD device according to the embodiments of the present invention, the size of the pad area can be reduced.

In the LCD device according to the embodiments of the present invention, the manufacturing cost can be reduced.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display (LCD) device comprising:
a plurality of horizontal gate lines in a horizontal direction in a liquid crystal panel;

a plurality of data lines and a plurality of vertical gate lines in a vertical direction that contiguously traverse an entire active area of the liquid crystal panel; and a driving IC connected to the plurality of vertical gate lines to supply a gate driving signal, and connected to the plurality of data lines to supply data voltages, wherein one horizontal gate line is connected to at least two vertical gate lines, and wherein the driving IC supplies a same gate driving signal to the at least two vertical gate lines, wherein a number of vertical gate lines connected to one horizontal gate line increases progressively from an upper end portion to a lower end portion of the liquid crystal panel, and wherein a number of points in which a plurality of scan signals are simultaneously supplied to one horizontal gate line increases with the progressive increasing of the number of vertical gate lines.

2. The LCD device of claim 1, wherein the vertical gate lines are M times a number of the horizontal gate lines, where M is an integer equal to or more than two.

3. The LCD device of claim 1, wherein among a plurality of channels provided at the driving IC, at least two channels supply a same gate driving signal to the at least two vertical gate lines.

4. The LCD device of claim 1, wherein at least two vertical gate lines connected to one horizontal gate line are at certain intervals in the liquid crystal panel.

5. The LCD device of claim 1, wherein three vertical gate lines are connected to a plurality of horizontal gate lines which are at a central portion of the liquid crystal panel, and wherein the driving IC supplies a same gate driving signal to the three vertical gate lines.

6. The LCD device of claim 1, wherein the driving IC is at an upper edge or a lower edge of the liquid crystal panel.

7. A liquid crystal display (LCD) device comprising:

a plurality of horizontal gate lines in a horizontal direction in a liquid crystal panel;

a plurality of data lines and a plurality of vertical gate lines in a vertical direction that contiguously traverse an entire active area of the liquid crystal panel; and a driving IC connected to the plurality of vertical gate lines to supply a gate driving signal, and connected to the plurality of data lines to supply data voltages, wherein one horizontal gate line is connected to at least two vertical gate lines, and wherein the driving IC supplies a same gate driving signal to the at least two vertical gate lines, wherein X vertical gate lines are connected to a plurality of horizontal gate lines which are at an upper end portion of the liquid crystal panel, wherein the driving IC supplies the same gate driving signal to the X vertical gate lines, and wherein Y vertical gate lines are connected to a plurality of horizontal gate lines which are provided at a lower end portion of the liquid crystal panel, and the driving IC supplies a same gate driving signal to the Y vertical gate lines, wherein X is an integer two or more and Y is an integer greater than X.

8. A method of driving a liquid crystal display (LCD) device, including a plurality of data lines and a plurality of vertical gate lines in a vertical direction in a liquid crystal panel, and a plurality of horizontal gate lines in a horizontal direction in the liquid crystal panel in which one horizontal gate line is connected to at least two vertical gate lines, the method comprising:

sequentially supplying, by a driving IC, a gate driving signal to the plurality of vertical gate lines that contiguously traverse an entire active area of the liquid crystal display panel, wherein the driving IC supplies a same gate driving signal to the at least two vertical gate lines at the same time, wherein a same gate driving signal is supplied to X vertical gate lines connected to a plurality of horizontal gate lines which are at an upper portion of the liquid crystal panel, and wherein a same gate driving signal is supplied to Y vertical gate lines connected to a plurality of horizontal gate lines which are at a lower portion of the liquid crystal panel, wherein X is an integer two or more and Y is an integer greater than X.

9. The method of claim 8, wherein among a plurality of channels of the driving IC, at least two channels supply a same gate driving signal to the at least two vertical gate lines.

10. The method of claim 8, wherein a j number of channels of the driving IC supply a same gate driving signal to a plurality of horizontal gate lines which are at an upper portion of the liquid crystal panel, wherein a k number of channels of the driving IC supply a same gate driving signal to a plurality of horizontal gate lines which are at a lower portion of the liquid crystal panel, and wherein j and k are integers.

11. The method of claim 8, wherein a same gate driving signal is supplied to three vertical gate lines connected to a plurality of horizontal gate lines which are at a central portion of the liquid crystal panel.

12. The method of claim 8, wherein the driving IC is at an upper edge or a lower edge of the liquid crystal panel.

* * * * *